June 20, 1950  L. B. HENDERSON  2,512,460
ROTATABLE TUBE-WELDING ELECTRODE
Filed Aug. 7, 1947  3 Sheets-Sheet 1

Inventor
LEONARD BAYLIFFE HENDERSON
By
Leon M. Strauss
AGT.

June 20, 1950 L. B. HENDERSON 2,512,460
ROTATABLE TUBE-WELDING ELECTRODE
Filed Aug. 7, 1947 3 Sheets-Sheet 3

Inventor
LEONARD BAYLIFFE
HENDERSON
By Leon M. Strauss
Att.

Patented June 20, 1950

2,512,460

UNITED STATES PATENT OFFICE 2,512,460

ROTATABLE TUBE-WELDING ELECTRODE

Leonard Bayliffe Henderson, Olton, Birmingham, England

Application August 7, 1947, Serial No. 767,289
In Great Britain August 21, 1946

4 Claims. (Cl. 219—6)

This invention relates to welding machines for, or for use, in making longitudinally seamed tubes, pipes or like bodies from sheet metal and with machines of the kind including a welding unit incorporating a pair of rotatable welding electrodes connected one to each of the terminals of the secondary circuit of a supply transformer, the connections between said secondary circuit and said electrodes including rotary contacts associated with said electrodes and dipping into containers of conducting liquid such as mercury adapted to provide continuity of electrical connection whilst permitting rotation of said electrodes and said contacts. The tube or pipe to be welded along the seam is fed beneath the electrodes having contact with the tube or pipe one on either side of the seam, said electrodes being rotated by the progressive movement of the tube or pipe, so that successive portions on the peripheries of the electrodes operate to perform the welding operation. This invention has for its object to provide means for efficiently cooling the rotating electrodes and rotating parts associated therewith. A further object is to obtain a strong and sturdy construction of the rotating welding head. A further object is to provide means enabling the electrode to be readily repaired or adapted for varying sizes of tubes or like work pieces. A further object of the invention contemplates a construction of welding head which can be applied to the "workpiece" with considerable pressure without distortion.

According to the present invention, the welding head for a machine of the type set forth comprises two units each formed of a disc or collar at the inner end of the unit constituting a rotating welding electrode, an annular drum or collar forming a contact for rotating in a conducting liquid such as mercury, and a spindle projecting from the outer end of the unit. A distance piece of insulating material is arranged between the said electrode discs and means are provided for fixing the electrode discs together to unite the two units with the insulating material electrically insulating the said two units and the structure is mounted in aligned bearings on supporting brackets. The drums or collars forming the rotating contacts and the electrodes have water passageways therein which are in communication with conduits in the spindle or body of the unit for the circulation of cooling water. The annular welding electrodes may be fitted with detachable rims for rolling on the "workpiece" on each side of the joint to be welded. The detachable electrode rings may each be formed with an annular channel closed by a ring or other member for the circulation of cooling liquid. A channel for the circulation of water is conveniently formed in the side of the detachable electrode rim and the channel may be closed by a side ring having tubes fitted thereto for the passage of circulating water. The mercury or conducting liquid may be circulated through a cooling channel during the rotation of the contact revolving therein.

In order that the invention may be clearly understood and readily carried into effect, reference may be had to the accompanying drawings, on which:

Figure 1:
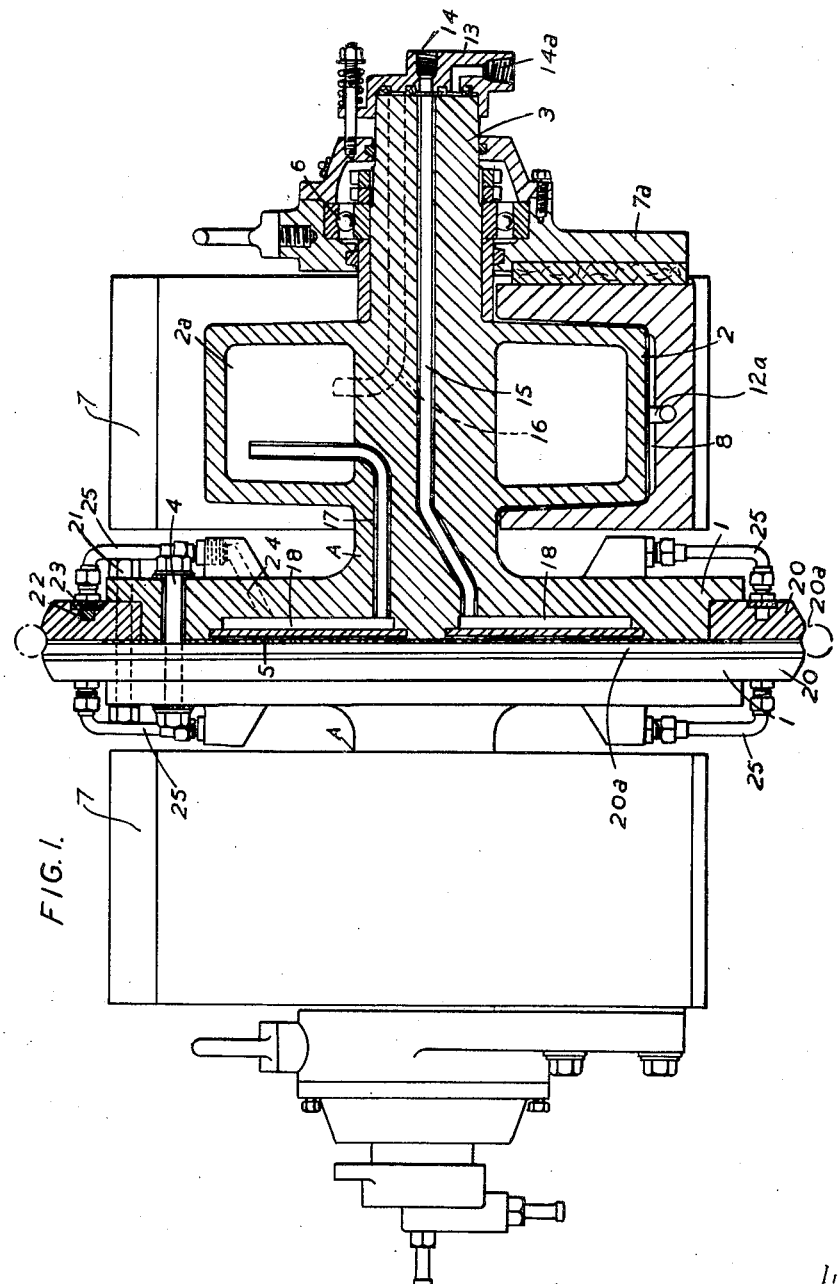
Figure 1 is a part side elevation and part sectional elevation of the welding head of Figure 2, the section being taken on line I—I of Figure 2.
Figure 2:
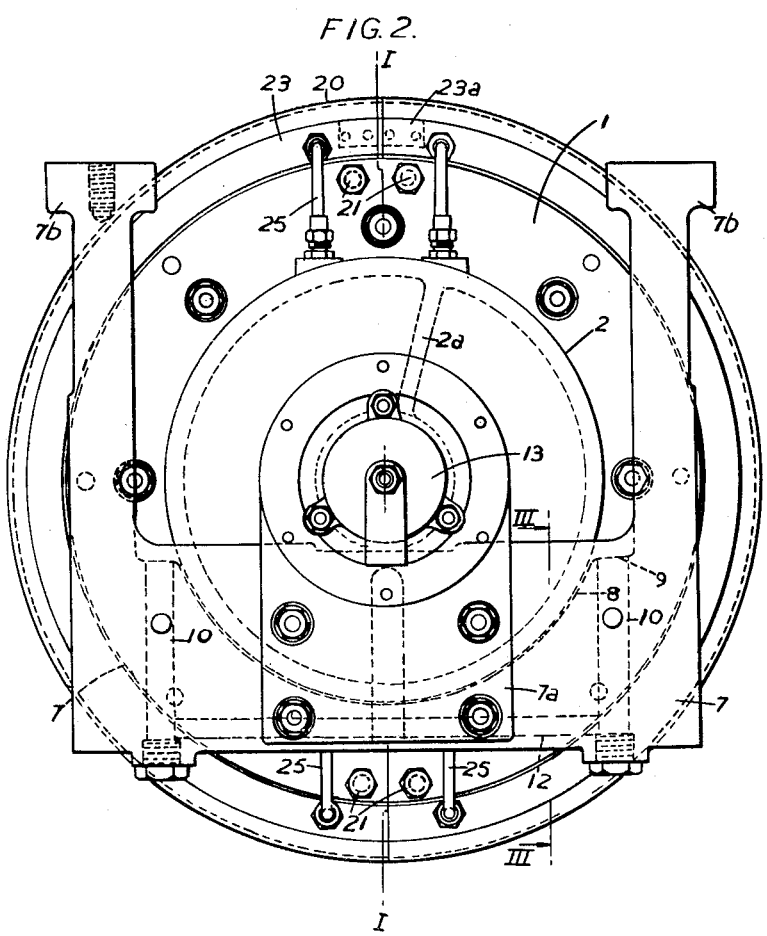
Figure 2 is an end view of a welding head constructed according to this invention.
Figure 3:
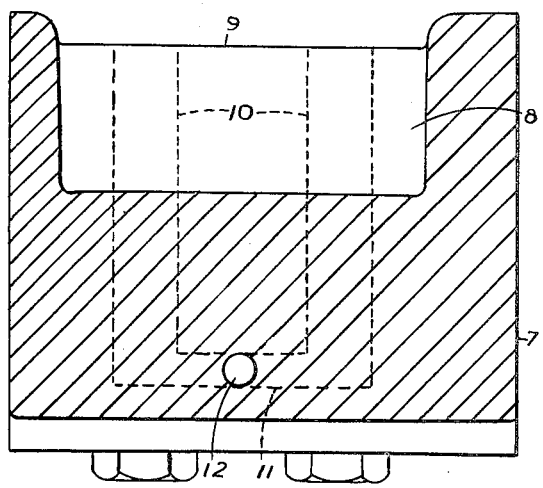
Figure 3 is a section on line III—III of Figure 2.
Figure 4:
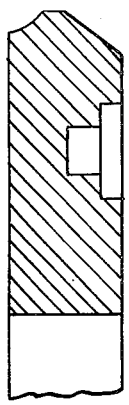
Figure 4 is an enlarged section of the detachable rim of the welding electrode.

According to a convenient embodiment of the invention, disc member or collar 1 forming the rotating electrode, the drum 2 constituting the rotating contact, and the spindle 3 are formed as a unit A. Two of such units A thus constructed are connected together by bolts 4 which pass through insulating sleeves in the electrode discs 1, a distance piece 5 of insulating material being fitted between the two electrode discs 1. A very rigid unit is thus obtained incorporating the two welding electrodes which are insulated from one another. When thus bolted together the two units can be machined to required finished dimensions like a single member. The spindles 3 are mounted in bearings 6 on members 7a carried by the brackets 7, which are suspended direct by the ends 7b from the terminals of the secondary of a transformer (not shown). The members 7a are electrically insulated from the brackets 7. These brackets 7 are shaped to form wells 8 in which the contact drum 2 rotates. The well 8 is filled with mercury or other conducting liquid.

The surface of the contact drum 2 lies close to the walls of the well 8 so that only a thin layer of mercury separates the surface of the drum and the surface of the walls of the well to reduce resistance. The drum also presents a large area of contact with the mercury. As the contact drum rotates there will be a tendency to carry the mercury forwardly up the curved surface of the well to a ledge 9 on the end of the well. Vertical conduits 10 pass from such ledge and communicate by way of horizontal conduits 11 and 12 to an opening 12a passing from the conduit 12 to the centre of the bottom of the well. Thus as the contact drum rotates the mercury is circulated from the well and through the conduits in the bracket 7 back to the well, thereby keeping the mercury cool. The rotating contact drum 2 is hollow having an annular chamber for receiving therein a cooling fluid or liquid. An inlet pipe 16 and outlet pipe 15 are cast in position in the unit A, the ends of the pipes passing to the outer end of the spindle 3. A gland 13 is spring pressed against this outer end of the spindle to form a water tight joint, such gland having holes 14 in register with the outlet conduit 15 and a hole 14a communicating with an annular chamber in the gland 13 in register with the inlet pipe 16. The inlet pipe 16 opens into the annular chamber or space in the contact drum 2 on one side of the radial partitions 2a and the pipe 17, also cast in the unit A, passes from this space on the other side of the partition 2a and opens into a round recess 18 in the outer face of the electrode disc or collar 1. The outlet pipe 15 also opens into a similar recess 18 in the outer face of the disc or collar 1. These recesses 18 are closed by plates. Each electrode disc is fitted with a detachable rim 20 which engages in an annular recess in the periphery of the disc 1 and the rims are fixed in position by means of studs or bolts 21. Each rim 20 has an annular recess 22 in the outer side face which is closed by a face ring 23. Each recess 18 communicates with two conduits 24 in the sides of the disc, and the pipes 25 place the conduits 24 in communication with the annular space 22, the pipes 25 being mounted on the ring 23. One recess 18 communicates with the channel 22 on one side of the rim and the other recess 18 communicates with the channel 22 on the diametrically opposite side. The channel is stopped by a filling piece 23a between each pair of pipes 25 so that the liquid is constrained to enter on one side of the channel and flow round the rim to the opposite side to the outlet. A continuous flow or circuit of cooling liquid therefore is obtained through passageways including hollow contact drum 2, recess 18 and from there to the annular groove or channel 22. From the groove or channel 22 the liquid passes to the other recess 18 and through the outlet pipe 15. As the electrode rims 20 are detachable they can be readily replaced when worn. These rims have curved surfaces 20a for bearing respectively on each side of the joint to be welded and the rims are readily replaceable for welding different diameters of pipes. The rims 20 are formed in two halves which enables them to be removed without disturbing any other part of the welding head. The two units A are combined together to form a very rigid structure and at the same time are electrically insulated from one another. The welding head is efficiently cooled and an efficient rotating conduit is obtained by the mercury.

Having thus described the invention, what is claimed as new and desired to be secured by Letters Patent, is:

1. A welding head for tube and like electric welding machines comprising two separate integral units, each unit comprising a spindle, an electrode forming disc member positioned at one end of said spindle, a hollow drum associated with said spindle and forming a rotating contact on said spindle, means fixing said electrode disc members together to thereby form a unitary structure, a bracket for each integral unit, each bracket including a well for containing an electric current conducting liquid, each drum extending into said well for contact with said electric conducting liquid whereby electric current may be transmitted to said drum and disc member of each unit, bearing means on each bracket for supporting said spindles of said structure, and passageways communicating with said hollow drum and passing through said spindle and said disc member for internally cooling each unit with a circulating cooling fluid.

2. A welding head for electric seam welding machines comprising two separate integral units, each unit including a spindle having an inner end, a disc forming a rotary welding electrode on said inner end of said spindle, a hollow drum forming a rotating conductor on the said spindle and in contact with an electric current conducting fluid whereby electric current may be transmitted from said fluid through said drum and said spindle to the respective disc, means fixing said electrode discs of said units together to obtain a unitary structure, a bracket provided with a well forming recess for containing an electric conducting liquid in which said drum rotates, a bearing on each bracket for mounting said spindles of said unitary structure in alignment with each other, and conduit means in each spindle for circulating cooling liquid therein, said conduit means being connected to said spindle and communicating with said hollow drum, and recess means in said electrode disc and in communication with said conduit means in said spindle to provide a fluid circuit for each unit.

3. A welding head for tube and like electric welding machines comprising two aligned spindles, a disc forming a rotary welding electrode integral with and positioned on the inner end of each spindle, a hollow drum forming a rotating conductor integral with each spindle and in contact with an electric current conducting fluid, insulating means between said discs to space the latter, means joining said electrode discs together to thereby obtain a unitary electrode structure, a bracket for supporting each spindle and provided with a well for containing an electric conducting liquid in which said drum rotates, a detachable rim composed of two semi-circular parts positioned on the periphery of each electrode disc, a circular groove in one side of said detachable rim, closure ring means closing said grooves to thereby form in each rim part a channel for circulating a cooling fluid, said drum including a chamber, cooling recesses in said electrode discs, conduits effectuating communication between said detachable rim and said drum chamber, an outlet conduit for said cooling fluid in the outer end of each spindle and connected to said groove and said chamber, and an inlet conduit for said fluid within each spindle and terminating in the respective drum chamber to achieve a fluid circuit.

4. A welding head according to claim 3, including a passageway in communication with said well containing the electric conducting liquid for directing said liquid back into said well when the liquid is raised by the rotating drum, said passageway leading into the bottom of the well, whereby said liquid is kept in circulation.

LEONARD BAYLIFFE HENDERSON.

REFERENCES CITED

The following references are of record in the file of this patent:

UNITED STATES PATENTS

| Number | Name | Date |
|---|---|---|
| 1,992,553 | Sykes | Feb. 26, 1935 |
| 2,044,180 | Newton | June 16, 1936 |
| 2,254,657 | Kennon | Sept. 2, 1941 |
| 2,279,932 | Von Henke | Apr. 14, 1942 |
| 2,407,676 | Munson | Sept. 17, 1946 |

FOREIGN PATENTS

| Number | Country | Date |
|---|---|---|
| 517,714 | Great Britain | Feb. 7, 1940 |